United States Patent
Lewis et al.

(10) Patent No.: US 8,212,203 B2
(45) Date of Patent: Jul. 3, 2012

(54) RADIATION DOSIMETRY METHOD

(75) Inventors: David F. Lewis, Monroe, CT (US); Carl A. Listl, New Hyde Park, NY (US); Xiang Yu, Bridgewater, NJ (US)

(73) Assignee: ISP Investments Inc., Wilmington, DE (US)

(*) Notice: Subject to any disclaimer, the term of this patent is extended or adjusted under 35 U.S.C. 154(b) by 333 days.

(21) Appl. No.: 12/710,004

(22) Filed: Feb. 22, 2010

(65) Prior Publication Data

US 2010/0213362 A1 Aug. 26, 2010

Related U.S. Application Data

(60) Provisional application No. 61/154,605, filed on Feb. 23, 2009.

(51) Int. Cl.
*G01D 18/00* (2006.01)

(52) U.S. Cl. .................. 250/252.1; 250/474.1
(58) Field of Classification Search .............. 250/252.1, 250/474.1
See application file for complete search history.

(56) References Cited

U.S. PATENT DOCUMENTS

| 7,361,908 B2 * | 4/2008 | Fung et al. ............... 250/474.1 |
| 7,482,601 B2 * | 1/2009 | Lewis et al. ............. 250/474.1 |

* cited by examiner

*Primary Examiner* — David Porta
*Assistant Examiner* — Hugh H Maupin
(74) *Attorney, Agent, or Firm* — William J. Davis; Thompson Hine LLP

(57) ABSTRACT

A radiation dosimetry method and associated devices for carrying out the method are disclosed herein. More particularly, a method and associated apparatus which compensates for variations in amounts of a radiation sensitive material in a radiation dosimetry film is provided.

18 Claims, 1 Drawing Sheet

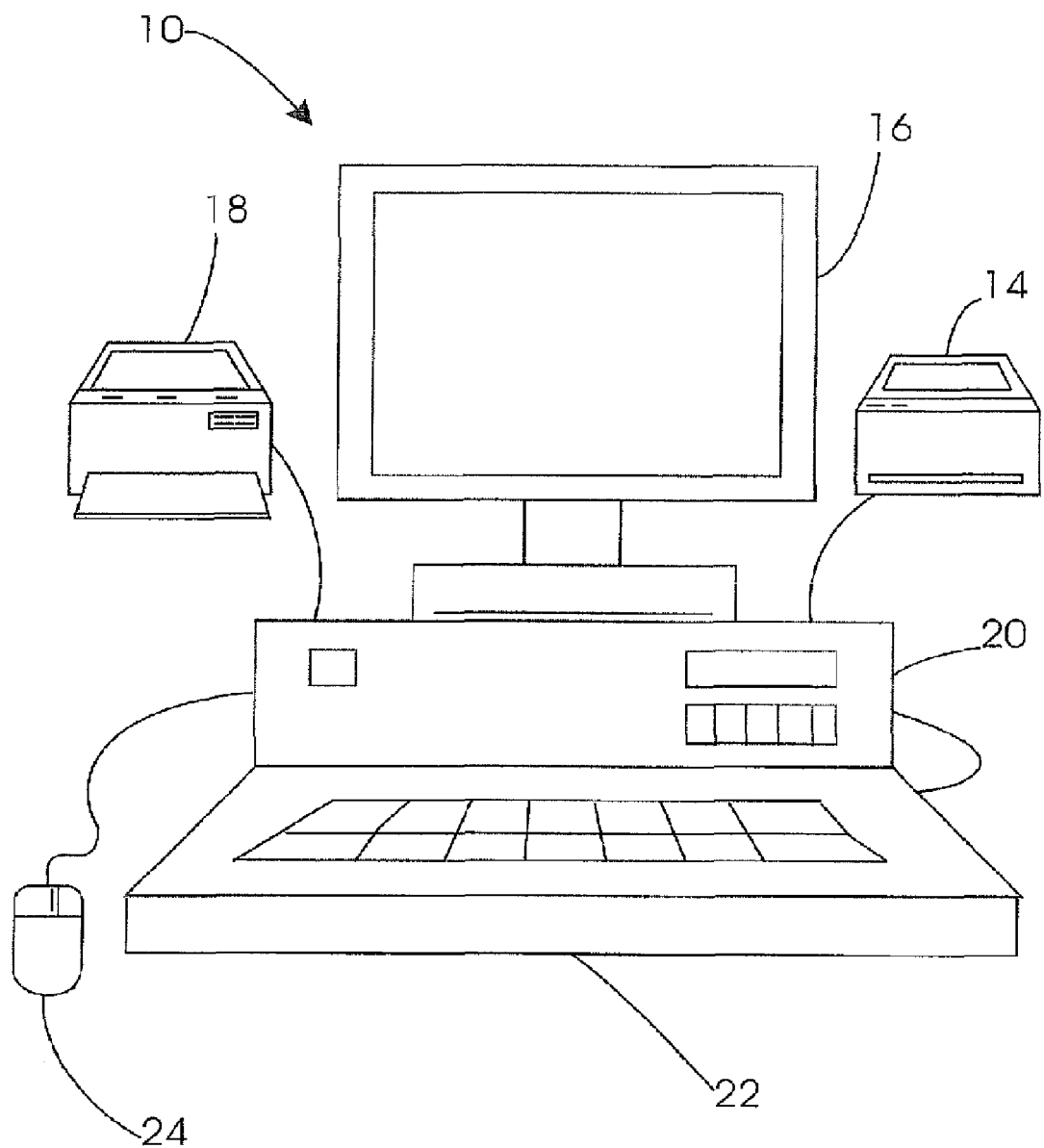

RADIATION DOSIMETRY METHOD

CROSS REFERENCE TO RELATED APPLICATION

This application claims the benefit of U.S. Provisional Application Ser. No. 61/154,605 filed Feb. 23, 2009, the entire contents of which are hereby incorporated by reference.

FIELD

This present application relates to a radiation dosimetry method and associated devices for carrying out the method. More particularly, this invention relates to such a method and associated apparatus which compensates for variations in amounts of a radiation sensitive material in a radiation dosimetry film.

BACKGROUND

In facilities where radiation sources materials are used, for example, in hospitals where cancer patients receive radiation treatments or in blood banks where blood products are irradiated, various methods are used to quantitatively determine the radiation dose. The methods practiced include the use of thermoluminescent dosimeters (TLD's), ionization-type radiation detectors, photographic film, and radiochromic materials. TLD's are inconvenient because they require a complicated and time-consuming read-out process. Ionization-type radiation detectors are awkward and unwieldy and require a complicated setup. Photographic film requires a time-consuming chemical processing procedure before readout. Radiochromic materials are inconvenient in current practice because the calculation of the dose requires a complex sequence of steps, subject to error.

U.S. Pat. No. 5,637,876 describes a radiation dosimeter, exemplarily for use in determining a level of radiation to which a patient is subjected during radiation treatment, which comprises a substrate provided with a layer of radiation sensitive material. The radiation sensitive material has an optical density which varies systematically in accordance with the degree of radiation exposure. The dosimeter may take the form of a card or a flexible substrate which is positionable on the patient or other irradiation subject and which is also positionable in, or slidable through a slot in, a dose reader which includes a reflection or transmission densitometer.

The radiation sensitive material of a radiation dosimeter may be dispersions of crystalline pentacosadiynoic acid (PCDA). Subjecting monomeric PCDA crystals to ionizing radiation results in progressive polymerization, the degree of polymerization increasing with radiation dose. The amount of polymerization (and hence, the radiation dose) can be determined by measuring either the optical density or the spectral absorption of the exposed dosimeter. However, it has been found that these parameters also vary with both the temperature of the device when measured as well as the thickness of PCDA dispersion. Maximum accuracy of dose measurement must account for the temperature and thickness effects.

Radiation dosimetry film provides a means for measuring radiation exposure at a point, but its principal utility is in obtaining a two-dimensional map of radiation exposure, i.e. radiation exposure at multiple points in a two-dimensional array. A typical user may measure an 8"×10" size film at a spatial resolution of 75 dpi, generating a map of radiation doses at 450,000 points. Of course, other resolutions can be used to generate the radiation exposure map.

In practice, there is a problem presented by the measurement of the radiation sensitive film at a multiplicity of points. The problem is the availability and cost of means to make the measurements. Measurements of absorbance of the active component of a film (e.g. PCDA or LiPCDA) at the primary absorbance peak and other components at predetermined wavelengths would require the use of a scanning spectrophotometer. Such equipment is not readily available and would be of high cost. Furthermore the speed of operation would be slow because of the low intensity of the light source at the specific wavelengths where measurement is required.

A possible solution to the problem is to employ a film or document scanner to collect measurements of the film. The advantage of such means is that these scanners are widely available, they are of relatively low cost (often <$1000), they scan at high spatial resolution (up to 2400 dpi), they are rapid in operation (8"×10" scan at 75 dpi resolution in <30 seconds), and they are adapted to measure color.

A film scanner is not like a spectrophotometer. It does not measure absorbance at specific wavelengths, but rather measures over a band of wavelengths. The band of wavelengths over which a specific model of scanner operates is defined by a combination of factors including the spectral output of a light source, the spectral absorbance of optical filters in the light path and the spectral response of the detector. A scanner adapted for color measurement will assess light absorbance integrated over three bands of wavelengths defining red, green and blue portions of the visible spectrum. The contribution of light absorbance at each wavelength to the total signal within a color band varies wavelength by wavelength. The weight at each wavelength is not user-defined, but rather depends on the aforesaid factors of spectral output of a light source, the spectral absorbance of optical filters in the light path and the spectral response of the detector.

SUMMARY

A radiation dosimetry method and associated devices for carrying out the method are disclosed herein. More particularly, methods and associated apparatus which compensate for variations in amounts of a radiation sensitive material in a radiation dosimetry film are provided.

A radiation dosimetry film is disclosed containing a radiation impervious dye in proportion to the radiation sensitive material and by means of which compensation for variations in amounts of the radiation sensitive material in the radiation dosimetry film may be made.

The available polyacetylenic radiation-sensitive components produce a colored polymer upon exposure to radiation. The polymer so produced exhibits absorption in all three bands of the visible spectrum over which commercially available, low-cost film scanners operate. The absorbance is relatively high in at least one color band and relatively low in at least one color band. While it is possible in practice to choose a radiation impervious dye that has essentially no absorbance in at least one color measurement band, the thickness correction must account for the fact that the received signal has a contribution from the radiation impervious dye as well as the colored component resulting from radiation exposure of the active component.

In accordance with one aspect, a radiation dosimetry method includes the following steps:

(a) scanning a radiation dosimetry calibration film, wherein the calibration film includes a plurality of imaged areas corresponding to a plurality of known radiation dose levels to generate a digital image, $I_C$, with at least two component channels $I_{C1}$, and $I_{C2}$;

(b) determining a first calibration curve for response values in a first component channel as a function of dose;

(c) determining a second calibration curve for response values in a second component channel as a function of dose;

(d) determining a conversion function between response values in the first component channel and response values in the second component channel;

(e) scanning a radiation dosimetry measurement film which has been exposed to a dose of radiation to generate a digital image, $I_M$ with at least two component channels $I_{M1}$ and $I_{M2}$.

(f) using the conversion function between response values in the first and second components channels of a calibration image to determine, for a measurement image $I_{M1}$ in the first component channel, the calculated response values in an image, $I_{M,C2}$, in the second component channel;

(g) using the difference in the measured response values of the image $I_{M2}$ in the second component channel and the calculated response values of image $I_{M,C2}$ to calculate a correction image; and (h) using the correction image to adjust the image $I_{M,1}$ to provide a corrected image $I_{M,1,Corrected}$ wherein the corrected image accounts for variations in thickness of the radiation-sensitive layer.

In accordance with certain embodiments the radiation dosimetry calibration film and the radiation dosimetry measurement film each comprises a substrate and a layer of radiation-sensitive material disposed on the substrate wherein the radiation-sensitive material comprises a radiation-sensitive active component and a radiation-impervious dye.

In accordance with another aspect, a radiation dosimetry method includes the following steps:

(a) scanning a radiation dosimetry measurement film which has been exposed to a dose of radiation to generate a digital image, $I_M$, wherein the radiation dosimetry measurement film includes a substrate and a layer of radiation-sensitive material disposed on the substrate and wherein the radiation-sensitive material includes a radiation-sensitive active component and a radiation-impervious dye. Exposure of the radiation-sensitive active component produces a colored compound that exhibits a peak absorbance in a first component channel of a scanner and the radiation-impervious dye exhibits a peak absorbance in a second component channel of the scanner; and (b) adjusting the digital image in the first component channel by accounting for variations present in the image in the second component channel to produce a corrected image.

BRIEF DESCRIPTION OF THE DRAWING

The FIGURE is a diagram illustrating a computer system and scanner useful in accordance with certain embodiments of the present invention.

DETAILED DESCRIPTION

In accordance with one aspect of the present invention, a radiation dosimetry film is provided that contains a marker dye to facilitate determination of dose response in a manner that accounts for variations in thickness of the radiation sensitive material. In accordance with particular embodiments, the dose response may be calculated using at least two component channels, more particularly using two color channels of a flatbed color scanner. The response value derived from the marker dye provides a baseline reference level that can be used to normalize the dose response derived from the radiation-sensitive active component.

The term "image" as used herein refers to the digital data corresponding to a scanned sample. The digital data may be the raw values directly obtained from the scanner or calculated values based on the raw values, such as density values.

The term "marker dye" or "radiation-impervious dye" refers to a dye that provides a baseline measure of the thickness of a radiation sensitive layer. Typically, the marker dye exhibits peak absorbance in a color channel different than the color channel in which the radiation-sensitive active component exhibits a peak absorbance. The marker dye typically will be soluble or dispersible in the binder matrix of the radiation sensitive material. The dye should exhibit no significant response to radiation exposure, i.e., the spectral response of the dye should exhibit no significant change in optical absorbance when exposed to radiation doses of less than 10 Gy and in some cases less than 100 Gy. The marker dye may be present in the radiation sensitive material in amounts ranging from about 0.001 to about 10% by weight, more particularly from about 0.01 to about 1% by weight, and in certain cases from about 0.1 to about 0.5% by weight.

Examples of useful marker dyes include, but are not limited to, tartrazine, eosin, quinoline yellow, metanil yellow. Useful dyes typically exhibit a peak absorbance in the blue portion of the visible spectrum with very little or no absorbance in the red part of the spectrum. Accordingly, these dyes are typically yellow in color. Tartrazine dye is particularly useful.

In accordance with one aspect of the present invention, a radiation dosimetry method is disclosed. The method includes scanning a radiation dosimetry calibration film, wherein the calibration film includes a plurality of imaged areas corresponding to a plurality of known radiation dose levels to generate a digital image, $I_C$, with at least two component channels $I_{C1}$ and $I_{C2}$; determining a first calibration curve for response values in a first component channel as a function of dose; determining a second calibration curve for response values in a second component channel as a function of dose; determining a conversion function between response values in the first component channel and response values in the second component channel; scanning a radiation dosimetry measurement film which has been exposed to a dose of radiation to generate a digital image, $I_M$, with at least two component channels $I_{M1}$ and $I_{M2}$. The radiation dosimetry calibration film and the radiation dosimetry measurement film each comprises a substrate and a layer of radiation-sensitive material disposed on the substrate wherein the radiation-sensitive material comprises a radiation-sensitive active component and a radiation-impervious dye. Then a conversion function between response values in the first and second components channels of a calibration image is used to determine, for a measurement image $I_{M1}$ in the first component channel, the calculated response values in an image, $I_{M,C2}$, in the second component channel and the difference in the measured response values of the image $I_{M2}$ in the second component channel and the calculated response values of image $I_{M,C2}$ is used to calculate a correction image which can be used to adjust the image $I_{M,1}$ to provide a corrected image $I_{M,1,Corrected}$ wherein the corrected image accounts for variations in thickness of the radiation-sensitive layer.

In accordance with another aspect of the present invention, a method for measuring the response of a radiation dosimetry film is provided which accounts for variations in thickness of the radiation sensitive layer. In one embodiment the method involves scanning a radiation dosimetry calibration film wherein the calibration film includes a number of imaged areas corresponding to known radiation dose levels to generate a three-color digital image, $I_C$, determining a first calibration curve for response values in a first-color channel ($I_{C,1}$) as a function of dose, determining a second calibration curve for response values in a second color channel ($I_{C,2}$) as a function of dose, and determining a conversion function between response values in the first color channel and response values in the second color channel. Then, a radiation dosimetry measurement film which has been exposed to a dose of radiation is scanned to generate a three-color digital image, $I_M$. Each of the radiation dosimetry calibration film and the radiation dosimetry measurement film includes a substrate and a layer of radiation-sensitive material disposed thereon wherein the radiation-sensitive material contains a radiation-sensitive active component and a radiation-impervious dye. A correction image is calculated based on the ratio of image $I_{C,2}$ divided by image $I_{M,C2}$ where $I_{M,C2}$ is the calculated response in the second color channel based on conversion of the image $I_{M,1}$, and finally adjusting the image $I_{M,1}$ by dividing by the correction image to provide a corrected image wherein the corrected image accounts for variations in thickness of the radiation-sensitive layer.

The term "radiochromic film" as used herein generally refers to film that changes color and produces a visible image when exposed to ionizing radiation, but experiences insignificant change from exposure to visible light or other forms of non-ionizing radiation.

The term "ionizing radiation" as used herein generally refers to radiation with a level of energy that is high enough to cause atoms to lose electrons and become charged or ionized. Ionizing radiation may be in the form of a high energy particles, like an alpha or beta particles, or in the form of electromagnetic waves, like gamma rays or x-rays. High energy particles and electromagnetic waves are released from the nuclei of radioactive atoms that are decaying or may be created by causing accelerated electrons to strike a metal target.

The present invention comprises both an apparatus 10 and a method for compensating for variations in thickness of a radiation sensitive material in a radiation dosimetry film. An example of an apparatus 10 is shown in the FIGURE. Although the present invention is described herein as it could be used in conjunction with a flatbed scanner 14, the present invention, as will be described in greater detail below, may be used in conjunction with any of a wide range of other optical scanner apparatus.

The apparatus or computer system 10 that performs the method may comprise a flatbed scanner 14. See the FIGURE. The apparatus 10 may further include a monitor 16, a printer 18, a processing unit 20, a keyboard 22, and a mouse 24. The apparatus 10 may be provided with image processing software (not shown) which allows the apparatus 10 to display an image of a scanned radiation dosimetry film on the monitor 16. The computer system 10 may also print an image (not shown) of the radiation dosimetry film on the printer 18. The image processing software may also provide various methods for analyzing and manipulating the data from the image.

In accordance with one aspect of the present invention, the method 10 generally comprises the following steps. In the first step, the radiation dosimetry film is positioned on a scanning bed of the flatbed scanner 14. The flatbed scanner 14 is actuated to scan the radiation dosimetry film and to produce a digital image data signal representative of the radiation dosimetry film. The image data signal may then be transferred to the processing unit 20 of the computer system 10 so that an image of the scanned radiation dosimetry film may be displayed on the monitor 16 or the data may be manipulated to provide image corrected data.

One significant advantage of certain aspects of the present invention is that it is easy to use since all the user has to do is scan the radiation dosimetry film. Indeed, the present invention can be used with currently available flatbed scanners and computers.

Having briefly described the apparatus 10 and the method according to one embodiment of the present invention, as well as some of their more significant features and advantages, the apparatus 10 and the associated method will now be described in detail. However, before proceeding with the description, it should be noted that although the apparatus 10 and method are shown and described herein as they could be used in conjunction with a flatbed scanner 14, they could also be used in conjunction with any of a wide range of other optical scanner apparatus. For instance, the apparatus 10 or method both could be used in conjunction with a digital camera. Consequently, the present invention should not be regarded as limited to use in conjunction with the flatbed scanner 14 shown and described herein.

With the foregoing considerations in mind, the apparatus 10 and method according to one embodiment of the present invention are both shown and described herein as they could be used in conjunction with a flatbed scanner 14, of the type that is readily commercially available and well-known in the art. However, since flatbed scanners are well-known in the art and could readily be provided by persons having ordinary skill in the art after having become familiar with the teachings of the present invention, the various component parts of the flatbed scanner 14 will not be discussed in further detail herein.

As shown in FIG. 1, the flatbed scanner 14 may be connected to a computer system or apparatus 10 that includes a monitor 16, a printer 18, a processing unit 20, a keyboard 22, and a mouse 24. The computer system 10 may be provided with image processing software (not shown) which allows the computer system 10 to display an image of the scanned film on a suitable display device 16, such as a CRT or LCD display. The computer system 10 may also print an image (not shown) of the scanned film on the printer 18.

The apparatus 10 may comprise a processor or central processing unit (CPU) 20, input devices (e.g., scanner 14, keyboard 22, mouse 24) and output devices (e.g., monitor 16, printer 18). The apparatus 10 may further include a storage device having an operating system, files, applications, databases and an image data processing system stored therein. The operating system, once installed, may manage the various tasks, jobs, data and devices of the computer system 10. The apparatus 10 may further include a memory which the operating system may access in carrying out its functions. Contained within a computer readable storage device such as the storage device or memory may be computer readable program code for performing or carrying out one or more of the various steps of method, which steps were discussed briefly above and are discussed in much greater detail below. The CPU 20 may be linked over a network (e.g., a Wide Area Network (WAN), a Local Area Network (LAN), an Intranet, or the Internet) to a server or pool of servers (not shown).

It is understood that the CPU 20 may comprise any of a wide range of suitable processors, as would be obvious to persons having ordinary skill in the art after having become familiar with the teachings of the present invention. For example, the CPU 20 may comprise a processor, an entire laptop or desktop personal computer (PC), or an application specific integrated circuit (ASIC) specifically manufactured for use with the present invention. Likewise, the storage device and memory can be any suitable computer readable storage device, such as read only memory (ROM), random access memory (RAM), video memory (VRAM), hard disk, floppy diskette, compact disc (CD), DVD, flash drive, memory card, magnetic tape, a combination thereof, etc. Further, the CPU 20 and memory need not be separate units and can be combined, or alternatively, the CPU 20 and memory 54 can be separately housed and linked to one another over a remote network or other suitable connection. In addition, there can be any number of CPUs 20 (i.e., one or more), any number of storage devices (i.e., one or more) and/or any number of memories (i.e., one or more) that are connected or linked via the Internet, Intranet, LAN, WAN, etc. In such a scenario, the storage of computer readable program code may be distributed over the various storage devices and memories and/or executed in parts by the various CPUs 20. Moreover, any number of suitable peripheral devices (e.g., scanner 14, monitor 16, printer 18, keyboard 22, mouse 24, etc.) may be connected to the CPU 20 either directly or indirectly (e.g., over the network). The CPU 20 can be linked to the network using any suitable connection (e.g., modem, T-1, digital subscriber line (DSL), infrared, etc.).

Within the storage device of apparatus 10 may be an image data processing system that is operatively associated with the flatbed scanner 14. The image data processing system may perform one or more of the various steps comprising the method. More specifically, the image data processing system may process the raw color image data signal (not shown) produced by the flatbed scanner 14 so that an image of the scanned object may be displayed or further processed.

In the embodiment shown and described herein, the image data processing functions occur within the processor 20 of the computer system 10. For example, computer programmable code (e.g., image data processing software) may be provided that carries out the various image data processing functions. The program code may be contained within a computer readable storage device, such as storage device or memory, and be operated on the processor 20. Alternatively, the image data processing system may be built into or reside in the housing of flatbed scanner 14. In other words, the flatbed scanner 14 may include the image data processing system so that the processing of the raw color image data signals produced by the scanning device occurs within the flatbed scanner 14. In an alternative embodiment, a device (not shown) specially designed (e.g., "hard wired") may be provided that is operatively associated with the scanner 14 and apparatus 10. The specially designed device may process the color image data signal. In yet another alternative embodiment, the image data processing functions may be split between the flatbed scanner 14 and the CPU 20 of the computer system 10 with each performing portions of the processing functions. In any event, a suitable arrangement for the image data processing system may be easily arrived at by persons having ordinary skill in the art after considering the requirements for the particular application and after becoming familiar with the teachings of the present invention.

The image data processing system may comprise any of a wide range of image data processing systems that are well-known in the art. Accordingly, the present invention should not be regarded as limited to any particular type of image data processing system. Moreover, since image data processing systems are well-known in the art and the details of image data processing systems themselves are not necessary to understand the present invention, the particular image data processing system utilized in one preferred embodiment of the present invention will not be described in further detail herein.

Regardless of the type of image data processing system that is utilized, if any portion of the image data processing system is built into or resides in the housing of flatbed scanner 14, it is generally desirable to provide the image data processing system with one or more communication ports (not shown) to allow data to be transferred or "downloaded" to the CPU 20. While any of a wide range of well-known communication ports and formats may be utilized, in one preferred embodiment, the image data processing system may be provided with a universal serial bus (USB) port (not shown) and/or an infra red (IR) serial port (also not shown). The USB port and/or IR serial port may be located on the scanner housing at any convenient location.

As discussed briefly above, the various steps disclosed herein need not be performed in the particular order shown. In other words, the arrangement described herein is merely illustrative and not intended to limit the teachings of the present invention.

In the first step, the radiation dosimetry film is positioned on the scanning bed of flatbed scanner 14. Of course, a digital camera or other handheld optical scanner device could also be used in place of the flatbed scanner 14.

Once the radiation dosimetry film (or portion thereof) and the scanning bed are positioned adjacent one another, the flatbed scanner 14 is actuated to scan the radiation dosimetry film and to produce a digital image comprising a plurality of component channels, typically a color digital image data signal representative of the scanned film. The color image data signal may then be transferred to the computer system 10 so that an image of the scanned object may be displayed on the monitor 16 at step 32 or the data may be further processed as described in more detail below.

One of ordinary skill in the art is well aware of the various methods that can be used to automatically expose areas of the radiation dosimetry film to different dose levels. For example, multi-leaf collimators, secondary collimators or fixed-blocks of radiation attenuating material, either alone or in combination, may be used to differentially shield the areas during exposure to ionizing radiation. The differentially shielded portions of the radiation detection medium allow for variations in dose level without altering the ionizing radiation characteristics such as beam intensity, individual exposure duration, etc. In accordance with other aspects of the invention, variations in dose level may be obtained by altering the ionizing radiation characteristics, by changing the rate at which the exposure dose is applied or by changing the time of exposure or by any combination of any of the aforesaid means.

Individual radiation dose levels depend on a number of factors, such as the radiation source, time of exposure, rate of exposure, distance between the source of the radiation and the radiation detection medium, etc. Calibration of the radiation dosimetry film in accordance with the present invention typically involves exposing the radiation detection medium to radiation dose levels that cover the range of the radiation dose levels expected to be encountered during use of the film. For example, typical radiation dose levels may fall within the range of from about 1 cGy to about 10000 cGy, more particularly from about 1 cGy to about 500 cGy, more particularly from about 1 cGy to about 200 cGy and in accordance with particular aspects of the invention, from about 1 cGy to about 100 cGy.

One embodiment of the present invention provides a radiation dosimetry method wherein the radiation dosimetry film is similar to a radiochromic film such as GAFCHROMIC® radiochromic films manufactured by International Specialty Products. Specific examples of radiochromic compositions that can be modified for use in the present invention include, but are not limited to, those disclosed in U.S. Patent Application Publication 2003/0129759 to Lewis et al., published Jul. 10, 2003, which is incorporated herein in its entirety.

Although the present invention is not limited to a particular type of radiation sensitive material, the following description relates to an embodiment of the invention based on the use of a particularly useful type of material similar to that used in GAFCHROMIC® radiochromic films. GAFCHROMIC® radiochromic films are self developing, not significantly sensitive to normal room light, and can be cut to a desired size. Exposure to ionizing radiation causes the radiochromic film to immediately change color, typically becoming darker. The degree of darkening is proportional to exposure and can be quantitatively measured with a densitometer or scanner.

The active component in the GAFCHROMIC® film media is a micro-particulate, radiation sensitive monomer that is dispersed in a polymer matrix and coated onto a polyester film base. When the active monomeric component is exposed to ionizing radiation, a polymerization reaction is initiated, resulting in the production of a dye polymer. Since the polymer is by nature, a dye, the exposure produces coloration within the film. The active ingredient in accordance with particular embodiments comprises a long chain fatty acid belonging to a class of molecules known as diacetylenes. Many members of the diacetylene family are characteristically radiation sensitive only when there is intermolecular order, as, for instance, in a crystalline or micellar state. Suitable acetylenic compounds have the structure $A\text{-}(CH_2)_n\text{-}C{=}C\text{-}C{=}C\text{-}(CH_2)_m\text{-}B$, where n and m are both independently an integer of from about 0 to 20, more particularly from about 6 to 14, and A and B are independently a methyl group, a carboxyl group or metal carboxylate group. When exposed to radiation, active diacetylenes undergo a solid-state polymerization reaction producing a dye polymer referred to as a polydiacetylene. The color and spectral absorbance of polydiacetylene is specific to the particular molecular structure, but preferably the color change is clearly visible on the radiation sensitive film. The color change is frequently cyan blue, purple or magenta.

Specific examples of such polyacetylenes include, but are not limited to, pentacosa-10,12-diynoic acid; 13,15-octacosadiyne and docosa-10,12-diyne-1,22-dioic acid. Of these, pentacosa-10,12-diynoic acid is particularly useful since it provides unusually high sensitivity to ionizing radiation exposure. It is to be understood however, that dispersions of other normally crystalline, color developing polyacetylenes having a conjugated structure can be employed alone or in admixture with the preferred diynes as the image receptive layers of the present invention. Such compounds include the diynes of the above structure wherein the A and/or B moieties, in addition to lower alkyl or carboxyl, can also be hydroxy, amido, lower alkyl substituted amido, an aliphatic or aromatic carboxylate ester group having up to 10 carbon atoms, a mono- or di-valent carboxylate metal salt group, halo, carbamyl, lower alkyl substituted carbamyl or tosyl, as well as the corresponding triyne and tetrayne products of the above polyacetylenes having from about 20 to 60 carbon atoms and a conjugated structure. Examples of these compounds include 10,12-docosadiynediol, the ditoluene-p-sulfonate of 9,11-eicosadiynoic acid, the monoethyl ester of 10,12-docosadiynedioic acid, the lithium, sodium or potassium salt of 10,12-pentacosadiynoic acid, the zinc salt of heneicosa-10,12-diynoic acid, the manganese salt of eicosa-5,7-diynoic acid, 10,12-docosadiyne chloride, 10,12-pentacosadiyne (m-tolyl-urethane), 10,12-pentacosadiyne {[(butoxyl-carbonyl)-methyl]urethane}, N-(dimethyl)-10,12-pentacosadiynamide, N,N'-bis(a 1-methylbenzy-1) 10,12-pentacosadiyndiamide and the like. In addition, the diacetylenes for use in accordance with the invention generally may also have the formula:

wherein R and R' are, for example, both $CH_2\text{-}O\text{-}CON\text{-}H\text{-}(CH_2)_5CH_3$. Such diacetylenes polymerize in the solid state either upon thermal annealing or exposure to high energy radiation. Suitable compounds are described in U.S. Pat. Nos. 5,420,000, 4,970,137, and 4,734,355, the contents of each of which are incorporated herein by reference. Preferably, the polyacetylenic compound has at least two conjugated acetylenic linkages and contains from about 10 to 60 carbon atoms.

Suitable compounds, which selectively absorb incident low energy photon radiation, are the metal halides and combinations thereof of Group I of the Periodic Table. Particularly useful are Group I metal chlorides, bromides and iodides. These compounds may be added in an amount effective to selectively absorb the incident low energy photon radiation, and generally in an amount of from about 0.1% to 50.0%, and more particularly from about 2.5% to 20% by weight of the dispersion of the coating as described hereinafter.

In accordance with some aspects of the invention, such halides are selected from the group consisting of cesium and rubidium halides and in particular, cesium chloride, cesium bromide, cesium iodide and combinations thereof.

In addition, it is possible to add an additional compound, which may be a metal ion chelating agent or sequestering agent. The chelating agent can be added in amounts of from about 0.01% to 10.0%, and more particularly from about 0.1% to 2% by weight, based on the weight of the diacetylene compound. Typical chelating agents include disodium ethylenediaminetetraacetate, sodium oxalate, citric acid, sodium citrate, sodium tartrate, sodium polyphosphate, potassium hypophosphate, sodium diethyldithiocarbamate, the sodium salt of N,N,N',N'-ethylenediaminetetra(methylenephosphonic acid), the sodium salt of 1-hydroxyethane-1,1-diphosphonic acid and combinations thereof.

An opacifying agent may also be added to the radiochromic composition. Usually such an agent is a water insoluble metal compound wherein the metal component has an atomic number greater than 18. Examples of suitable compounds include oxides, carbonates, sulfates, sulfites, sulfides, carboxylates, phosphates, phosphates and silicates. An antioxidizing agent may also be added to the composition, usually in an amount of from about 0.01% to 5%, and more particularly from about 0.1 to 1% by weight of the weight of the diacetylene component. Suitable antioxidizing agents include propyl gallate, Tenoxo 6 (TENOX® is a trademark of the Eastman Chemical Company), TENOX® 2, TENOX® 7, TENOX® 20, sodium diethyldithiocarbamate, citric acid, sodium citrate, ascorbic acid, alkali metal sulfides and sulfites, 3-tert-butyl-4-hydroxy-5-methyl-phenyl sulfide, butylated hydroxytoluene, butylated hydroxyanisole, tert-butylhydroquinone, hydroxylamine and hydroxylamine hydrochloride.

The acetylenic component may also be sandwiched between two substrates in which one or both of the substrates may have the capability to filter or absorb light in the UV and/or visible wavelength regions. At least one of the substrates should be transparent in at least part of the visible spectrum.

Particularly useful as substrates are thin, flexible films made from materials such as polyethylene teraphthalate, polyethylene, polypropylene, cellulose acetate and the like.

In accordance with a particular method for preparing a radiochromic film useful herein, the polyacetylenic compound is dispersed in a non-solvating liquid and may be ripened or aged to maximize its radiation sensitivity. This dispersion may also contain a dissolved polymeric binder. Examples of binders include, but are not limited to, gelatin, agar, xanthan gum, polyvinylalcohol and polymers and copolymers containing maleic acid or acrylic acid residues, or salts thereof. The liquid dispersion is then applied onto the surface of a film, e.g., a polyester or similar film, and the coating is then dried. In particular, the normally crystalline or molecularly ordered polyacetylenic compound is dispersed into the non-solvating liquid in a concentration of from about 2 to 50% based on the combined weights of the polyacetylenic compound, the non-solvating liquid and the polymeric binder dissolved therein. The dispersion may then be aged or ripened by either (a) storing the composition at a temperature of from about 0° C. to about 12° C. for a period of from about 1 to 30 days, or (b) freezing the dispersion at a temperature between about −78° C. and about −1° C. for a period of time from about 1 to about 75 hours, or (c) heating the dispersion to a temperature between about 40° C. and about 100° C. for a period of time between about 10 minutes and 24 hours, or (d) a combination of any of the above techniques. This aging or ripening step is to be completed before drying the dispersion on the substrate.

In accordance with this invention a marker dye is added to the dispersion prior to coating on a substrate. The marker dye is mixed with the dispersion so that it is homogeneous with the radiation-sensitive polyacetylenic compound.

In accordance with one aspect of the present invention, after the aging or ripening of the dispersion, a compound containing an elemental component which selectively increases the absorption of incident low energy photon radiation <200 keV is mixed therewith in an amount which is effective to absorb incident low energy photon radiation when the dried composition is exposed thereto. Examples of elemental components that may be useful include, but are not limited to, chlorine, bromine, iodine, potassium, rubidium, cesium, barium, tungsten, lead and bismuth.

The thus mixed composition is then applied as a layer onto a substrate or support layer. Examples of substrates or supports that may be used include, but are not limited to, polymeric, metallic, glass, silicon and gallium arsenide. In accordance with a particular embodiment of the invention, the substrate or support layer may be a polymeric film which is permeable to low energy x-rays. The thus coated substrate is then dried at a temperature from about ambient up to about 100° C. but below the distortion temperature of the substrate and below the decomposition temperature of any of the components of the coating or the melting point of the polyacetylene compound therein. The drying operation is generally conducted over a period of from about 20 seconds to about 10 hours and is typically effected at 15° to 60° C. for a period of from about 1 minute to about 5 hours.

The film thus formed is sensitive to radiation and, upon irradiation, a polymerization process is initiated in the polyacetylenic compound resulting in an immediate change in the color of the coating. The color darkens in proportion to the radiation exposure. The degree of darkening may be measured with a number of instruments including densitometers, spectrophotometers and film scanners. Generally when making such measurements, the color change of a transparent film sample would be assessed by measuring the proportion of light transmitted through the sample. Similarly, film coated on an opaque film base would be appropriately examined by measuring the proportion of light reflected from the sample.

Since the film darkens in proportion to radiation exposure, it is possible to measure the darkening and use this measurement as a means for determining the amount of the radiation exposure based on the calibration determined as described herein. Thus, the film may be employed as a radiation dosimeter, to measure and map radiation fields.

The radiation may be any type of ionizing radiation. Preferably the ionizing radiation takes the form of alpha particles, beta particles, x-rays, Gamma rays, short wavelength UV, neutrons or charged particle radiation. These particles or rays may be formed by decaying radioactive atoms, or by accelerated electrons or other charged particles striking a metal target or causing a discharge in a volume of gas. In one embodiment of the present invention the radiation is gamma radiation produced by iridium, preferably iridium-192. In another embodiment of the present invention the radiation is x-ray radiation. X-rays are produced when electrons collide with the atoms and nuclei of a metal target.

Certain aspects of the present invention is described in more detail in the following non-limiting examples. Although the examples describe various algorithms that can be used in accordance with the present invention, other algorithms can also be used as recognized by those of ordinary skill in the art to provide the same or similar adjustments and modifications of the scanned images.

EXAMPLE 1

A coating composition was prepared by mixing the following components:

| | |
|---|---|
| Polyvinyl alcohol (25% in water): | 45 parts by weight |
| Lithium salt of pentacosadiynoic acid (18% in water): | 50 parts by weight |
| Water: | 1.915 parts by weight |
| Surfactant 10G (10% in water): | 0.958 parts by weight |

The composition described was coated on a transparent polyester substrate. The fluid was metered onto the substrate through a slot die applicator to produce a coating with a nominal wet thickness of 0.005". The wet coating was run through a forced hot-air dryer yielding a dry coating with a thickness of approximately 28 microns. The coating was almost colorless.

EXAMPLE 2

A coating composition was prepared by mixing the following components:

| | |
|---|---|
| Polyvinyl alcohol (25% in water): | 45 parts by weight |
| Lithium salt of pentacosadiynoic acid (18% in water): | 50 parts by weight |
| Tartrazine (15% in water) | 1.915 parts by weight |
| Surfactant 10G (10% in water): | 0.958 parts by weight |

The composition above was coated on a transparent polyester substrate. The fluid was metered onto the substrate through a slot die applicator to produce a coating with a nominal wet thickness of 0.005". The wet coating was run through a forced hot-air dryer yielding a dry coating with a thickness of approximately 28 microns. The coating was yellow in color.

EXAMPLE 3

A piece of the coating of Example 1 was placed in a spectrophotometer and the absorption spectrum was recorded between wavelengths of 350 nm and 800 nm. There were no absorption peaks in the spectrum. The absorbance values changed almost linearly from a value of about 0.04 at 800 nm to a value of about 0.18 at 350 nm.

EXAMPLE 4

A piece of the coating of Example 2 was placed in a spectrophotometer and the absorption spectrum was recorded between wavelengths of 350 nm and 800 nm. The spectrum showed a peak absorbance value approaching 2.0 at a wavelength about 420 nm. The absorbance fell to a value of about 0.12 at wavelengths greater than 510 nm. The absorption band with its peak at about 420 nm results from the presence of tartrazine in the coating.

Between the wavelengths of about 510 nm and 800 nm the spectral absorbance of the coating of Example 2 is almost indistinguishable from the spectral absorbance of the coating of Example 1.

These observations establish that the tartrazine dye produces strong spectral absorbance in the blue portion of the spectrum below about 500 nm, but has essentially no absorbance in the red part of the spectrum above 600 nm.

EXAMPLE 5

A piece of the coating of Example 1 was exposed to x-radiation at an absorbed dose of about 2 Gy. After irradiation the sample was a blue color. The exposed film was placed in a spectrophotometer and the absorption spectrum was recorded between wavelengths of 350 nm and 800 nm. Major and minor absorbance peaks were present at wavelengths of 635 nm and 585 nm respectively. There were two shoulders on the lower wavelength side of the minor absorbance peak and there was a prominent tail extending down to 350 nm.

These observations establish that the radiation sensitive component in the film produces the strongest response in to red portion of the spectrum >600 nm and responds less strongly in the green portion of the spectrum from 500-600 nm. The observations also establish that the radiation sensitive component produces the least response in the blue portion of the spectrum <500 nm.

EXAMPLE 6

A piece of the coating of Example 2 was exposed to x-radiation at an absorbed dose of about 2 Gy. After irradiation the sample was a green color. The exposed film was placed in a spectrophotometer and the absorption spectrum was recorded between wavelengths of 350 nm and 800 nm. Major and minor absorbance peaks were present at wavelengths of 635 nm and 585 nm respectively. There was one shoulder on the lower wavelength side of the minor absorbance peak and a major absorbance peak at approximately 420 nm.

Comparing the spectrum of the sample of this Example with the sample from Example 5 it was observed that the total absorbance at the major and minor peaks was virtually the same in the two samples. This establishes that the tartrazine dye has an insignificant effect on the absorbance of the active component in the red portion of the spectrum >600 nm.

Comparing the spectrum of the sample of this Example with the spectrum of the sample of Example 4 at wavelengths <500 nm it was observed that the absorbance values of the exposed sample were about 5%-10% greater than the unexposed sample. This establishes that the response of the film in the blue portion of the spectrum is principally due to the tartrazine dye, but that there is a significant component to the absorbance resulting from exposure of the active component.

Overall the observations establish that the response in the blue portion of the spectrum is dependent on the exposure of the active component in the film, but the response in the red portion of the spectrum is independent of the tartrazine dye.

EXAMPLE 7

A coating composition was prepared by mixing the following components:

| | |
|---|---|
| Polyvinyl alcohol (25% in water): | 57 parts by weight |
| Water: | 38 parts by weight |
| Tartrazine (15% in water) | 1.915 parts by weight |
| Surfactant 10G (10% in water): | 0.958 parts by weight |

The composition above was coated on a transparent polyester substrate. The fluid was metered onto the substrate through a slot die applicator to produce a coating with a nominal wet thickness of 0.005". The wet coating was run through a forced hot-air dryer yielding a dry coating with a thickness of approximately 19 microns. The coating was yellow in color.

A piece of the coating was placed in a spectrophotometer and the absorption spectrum was recorded between wavelengths of 350 nm and 800 nm. The spectrum showed a peak absorbance value approaching 2.0 at a wavelength about 420 nm.

The sample was then exposed to x-radiation at an absorbed dose of about 50 Gy. There was no observable change in color due to the radiation exposure. The exposed film was placed in a spectrophotometer and the absorption spectrum was recorded between wavelengths of 350 nm and 800 nm. The absorption spectra were identical before and after exposure. This establishes that the tartrazine dye is impervious to the effects of radiation exposure at absorbed doses up to 50 Gy.

EXAMPLE 8

An 8"×10" piece of the coated film described in Example 2 was placed on an Epson 10000XL film scanner fitted with a transparency adapter. Two control films approximately 2"×2" in size and composed of transparent yellow and transparent blue filter materials were attached to the bed of the scanner. Their locations were separate from the 8"×10" film. This larger film was placed in such a way on the scanner that it could be removed and replaced with in 0.5 mm of the original position.

The scanner was connected to a computer and controlled through the use of Epson Scan software interface. In this software application all options for color correction were turned off. This permits acquisition of raw response values from the scanner without application of any type of image correction algorithm.

An rgb image was collected of the 8"×10" film and control films at a spatial resolution of 50 dpi. This rgb image was split into its red, green and blue component parts. The blue component image was displayed on a computer monitor. It was observed that the image was not of uniform darkness. This indicates that the thickness of the coating on the sample film was not uniform.

The film was placed on a light table and visually inspected. This revealed that the yellow color of the film was not perfectly uniform and that there were areas with optical density that was slightly more than average and other areas with optical density slightly less than average. By careful comparison it appeared that the pattern of lightness and darkness visually observable on the film corresponded with the pattern in the blue component image displayed on the computer monitor.

EXAMPLE 9

The 8"×10" film of Example 8 was exposed to a uniform field of 6 MV x-radiation produced by a linear accelerator. The absorbed dose was approximately 2 Gy. After exposure the film had turned a green color. Careful inspection of the exposed film on a light table showed that the appearance of the film was not perfectly uniform. Some areas had an optical density that was slightly more than average and some had an optical density slightly less than average. By careful comparison it appeared that the pattern of lightness and darkness visually observable on the exposed film corresponded with the pattern in the blue component image of Example 8 displayed on a computer monitor.

The exposed film was placed back on the Epson 10000XL scanner in registration with the original placement described in Example 8. The two control films were still on the scanner and had not been moved. An rgb image was collected of the exposed 8"×10" film and the control films at a spatial resolution of 50 dpi. The image was split into its red, green and blue component parts.

EXAMPLE 10

The images of the unexposed and exposed films of Examples 8 and 9 were measured using MIRA AP6 image analysis software. One feature of this software permits the measurement of the scanner response values within user defined areas of interest within the red, green and blue component parts, or channels, of an rgb image.

In this manner the blue channel image of the unexposed 8"×10" film (Example 8) was measured. The area of interest was approximately 7.5"×9.5" centered on the film. The mean response value, $M_{U,B}$, was measured. A correction image, $IC_{U,B}$ was then generated by normalizing all the pixel values in the original blue channel image with respect to the value $M_{U,B}$. This operation was performed using the image arithmetic function in the MIRA AP6 software to divide the scanner response value of each individual pixel by $M_{U,B}$. The correction image contains information about the thickness differences in the 8"×10" film. If the film was perfectly uniform all the pixels in the image would have a value of 1, but the presence of small thickness differences cause the values to be slightly greater than 1 or slightly less than 1 depending on whether the coating at that position is slightly thicker or thinner than average.

The red channel component image of the exposed 8"×10" film of Example 9 was examined. Thus the MIRA AP6 software was used to display profiles of scanner response values within selected areas of interest. Profiles were obtained across areas of the image where non-uniformities were evident from the display on the monitor. From these profiles it could be seen that the scanner response values varied by up to at least ±3%. Of course, even in a perfectly uniform film, the response values would not be all exactly 1.000. Thus, there is an error in pixel value measurement caused by noise sources within the scanner itself. However, these noise contributions are about 0.25%-0.5%, small when compared to the thickness variations that are to be corrected.

A correction was then applied to the red channel image of the exposed film. The image arithmetic function of the MIRA AP6 software was employed to divide the red channel image of the exposed film by the correction image $IC_{U,B}$. In this manner the response value of each pixel in the red channel image of the exposed film was divided by the value of the corresponding pixel in the correction image. Since the response values in the correction image vary according to differences in thickness, the image division operation flattened the red channel image of the exposed film, producing an image in which the response values were independent of thickness.

The MIRA AP6 software was used to display profiles of scanner response values within selected areas of interest of the flattened red channel image. Profiles were obtained across areas of the flattened image and compared to profiles across the same areas of the image before flattening. It was observed that whereas the scanner response values varied by up to at least ±3% before flattening, the values after flattening varied by less than ±1%. This demonstrates that incorporation of a dye in the film can provide a means by which to correct the response of a radiation sensitive film for differences in thickness.

EXAMPLE 11

The benefit demonstrated in Example 10 notwithstanding, it is very inconvenient for a user to have to scan each film before and after exposure and to place the films accurately on the scanner so that the positions are in perfect registration. The description that follows defines a procedure that may be employed where films are used for radiation dosimetry. The advantage of the method described is that each film is only scanned a single time.

In the process of film dosimetry for radiation dose measurement it is common to employ a film, or films, upon which a set of calibrated exposure doses have been made. This film, or set of films, is referred to as the calibration film. In the process of film dosimetry it is also common to have exposed a film, or films, to a radiation field for the purpose of determining the radiation doses delivered over a two-dimensional plane within the radiation field. This film, or set of films, is referred to as the measurement film.

The process for applying corrections to compensate for differences in thickness of the measurement film is described as follows.

In this example the measurement film, M, was the 8"×10" film described in Example 9. The calibration film, C, was a film from the same lot number as the measurement film upon which a number of defined areas had received known doses of radiation. Both films were scanned in rgb transmission mode at 75 dpi on an Epson 10000XL film scanner fitted with a transparency adapter. The red channel and blue channel images, $I_{M,R}$ and $I_{M,B}$, were extracted from the rgb image of the measurement film. Similarly the rgb image of the calibration film yielded images $I_{C,R}$ and $I_{C,B}$.

Image analysis software (MIRA AP6) was used to measure the response values in the exposed areas of images $I_{C,R}$ and $I_{C,B}$. A plot of the red response values vs. radiation dose yielded a calibration curve. The values were fitted to a polynomial function. A second plot was made showing the relationship between the red response values and the blue response values. Again the values were fit to a polynomial function. Of course, other fitting functions such as exponential linear, rational linear, reciprocal linear functions could also be used.

The polynomial function relating red and blue response values was then applied to the pixel values in image $I_{M,R}$ thereby creating an image $I_{M,CB}$ that is the calculated response in the blue color channel. A correction image $CI_M$ was then calculated by using image arithmetic functions to divide image $I_{C,B}$ by image $I_{M,CB}$. The correction image contains values that are close to 1.0, the values being slightly greater in areas where the coating is thicker and slightly less where the coating is thinner. Thus the correction image can be used to compensate for small differences in thickness. By this means, the red channel measurement image, $I_{M,R}$, was corrected by using image arithmetic to divide image $I_{M,R}$ by the correction image $CI_M$. The corrected image is referred to as image $I_{M,R,Corrected}$.

Red channel images before and after correction, $I_{M,R}$ and $I_{M,R,Corrected}$ respectively, were then converted from scanner response value space to dose space by applying the polynomial function described above defining the relationship between the absorbed dose and the red scanner response values. The dose images were displayed on a computer monitor using the same settings for the display window. It was evident that the uncorrected dose image was not uniform as evidenced by differences in the darkness of the image on the monitor. By comparison the corrected dose image appeared significantly more uniform.

The MIRA AP6 image analysis software was used to calculate and display dose profiles across selected portions of the images. Care was taken to select corresponding portions of the two images. Upon examination the dose variation in the uncorrected image was up to about ±8 cGy, i.e. about ±4% of the mean. By comparison the dose variations in the corrected image were less than 2 cGy, i.e. less than 1%. This demonstrates that incorporation of a dye in the film can provide a means by which to correct the response of a radiation sensitive film for differences in thickness. The method can be utilized to provide corrections to film images based on scanner response in a color channel where the signal provided is primarily due to a radiation impervious dye, but is not completely independent of the response of the active, radiation sensitive component.

EXAMPLE 12

This example describes another process for applying corrections to compensate for differences in thickness of the measurement film. The process is described as follows.

The measurement film, M, was the 8"×10" film described in Example 9. The calibration film, C, was a film from the same lot number as the measurement film upon which a number of defined areas had received known doses of radiation. Both films were scanned in rgb transmission mode using 16 bits per color channel at 75 dpi spatial resolution an Epson 10000XL film scanner fitted with a transparency adapter. The 16-bit red channel and blue channel images, $I_{M,R}$ and $I_{M,B}$, were extracted from the rgb image of the measurement film. Similarly the rgb image of the calibration film yielded images $I_{C,R}$ and $I_{C,B}$.

Image analysis software (MIRA AP6) was used to convert the pixel values in all the calibration and measurement images $I_C$ and $I_M$ from scanner value space to density value space. Thus $PV_D = -\log_{10}(PV_{S/65535})$ where $PV_D$ is the pixel value in density space and $PV_S$ is the pixel value in scanner value pace. The density space calibration and measurement images are denoted as $ID_C$ and $ID_M$.

Image analysis software (MIRA AP6) was used to measure the response values in the exposed areas of density space images $ID_{C,R}$ and $ID_{C,B}$. A plot of the red response values vs. radiation dose yielded a calibration curve. The values were fitted to a polynomial function. A second plot was made showing the relationship between the red response values and the blue response values. Again the values were fit to a polynomial function.

The polynomial function relating red and blue response values was then applied to the pixel values in the density-space image $ID_{M,R}$ thereby creating an image $ID_{M,CB}$ that is the calculated response in the blue color channel. A correction image $CID_M$ was then calculated by using image arithmetic functions to subtract image $ID_{C,B}$ by image $ID_{M,CB}$. The correction image contains values that are close to zero, the values being slightly greater in areas where the coating is thicker and slightly less where the coating is thinner. Thus the correction image can be used to compensate for small differences in thickness. By this means, the red channel measurement image, $ID_{M,R}$, was corrected by using image arithmetic to subtract the correction image $CID_M$ from $ID_{M,R}$. The corrected image is referred to as image $ID_{M,R,Corrected}$.

Red channel images before and after correction, $ID_{M,R}$ and $ID_{M,R,Corrected}$, respectively, were then converted from scanner response value space to dose space by applying the polynomial function described above defining the relationship between the absorbed dose and the red scanner response values. The dose images were displayed on a computer monitor using the same settings for the display window. It was evident that the uncorrected dose image was not uniform as evidenced by differences in the darkness of the image on the monitor. By comparison the corrected dose image appeared significantly more uniform.

The MIRA AP6 image analysis software was used to calculate and display dose profiles across selected portions of the images. Care was taken to select corresponding portions of the two images. Upon examination the dose variation in the uncorrected image was up to about ±8 cGy, i.e. about ±4% of the mean. By comparison the dose variations in the corrected image were less than 2 cGy, i.e. less than 1%. This demonstrates that incorporation of a dye in the film can provide a means by which to correct the response of a radiation sensitive film for differences in thickness. The method can be utilized to provide corrections to film images based on scanner response in a color channel where the signal provided is primarily due to a radiation impervious dye, but is not completely independent of the response of the active, radiation sensitive component.

It is to be understood that the computer readable program code can be conventionally programmed using any of a wide range of suitable computer readable programming languages that are now known in the art or that may be developed in the future. It is also to be understood that the computer readable program code can include one or more functions, routines, subfunctions, and subroutines, and need not be combined in a single software package.

It is contemplated that the inventive concepts herein described may be variously otherwise embodied and it is intended that the appended claims be construed to include alternative embodiments of the invention except insofar as limited by the prior art.

The invention claimed is:

1. A radiation dosimetry method comprising:
    scanning a radiation dosimetry calibration film, said calibration film comprising a plurality of imaged areas corresponding to a plurality of known radiation dose levels to generate a digital image, $I_C$, with at least two component channels $I_{C1}$ and $I_{C2}$;
    determining a first calibration curve for response values in a first component channel as a function of dose;

determining a second calibration curve for response values in a second component channel as a function of dose;

determining a conversion function between response values in the first component channel and response values in the second component channel;

scanning a radiation dosimetry measurement film which has been exposed to a dose of radiation to generate a digital image, $I_M$, with at least two component channels $I_{M1}$ and $I_{M2}$;

wherein said radiation dosimetry calibration film and said radiation dosimetry measurement film each comprises a substrate and a layer of radiation-sensitive material disposed on said substrate wherein said radiation-sensitive material comprises a radiation-sensitive active component and a radiation-impervious dye;

using said conversion function between response values in the first and second components channels of a calibration image to determine, for a measurement image $I_{M1}$ in the first component channel, the calculated response values in an image, $I_{M,C2}$, in the second component channel;

using the difference in the measured response values of the image $I_{M2}$ in the second component channel and said calculated response values of image $I_{M,C2}$ to calculate a correction image; and using said correction image to adjust the image $I_{M,1}$ to provide a corrected image $I_{M,1,Corrected}$ wherein said corrected image accounts for variations in thickness of the radiation-sensitive layer.

2. The method of claim 1 wherein said correction image is calculated based on the ratio of the image $I_{M2}$ in the second component channel and the calculated image $I_{M,C2}$; and said corrected image $I_{M,1,Corrected}$ is calculated by dividing image $I_{M,1}$ by the correction image wherein said corrected image accounts for variations in thickness of the radiation-sensitive layer.

3. The method of claim 1 wherein said correction image is calculated based by subtracting the calculated image $I_{M,C2}$ from the image $I_{M2}$ in the second component channel; and said corrected image $I_{M,1,Corrected}$ is calculated by subtracting the correction image from the image $I_{M,1}$ wherein said corrected image accounts for variations in thickness of the radiation-sensitive layer.

4. The method of claim 1 wherein the digital image comprises an RGB digital image.

5. The method of claim 4 wherein the first component channel comprises the red channel of an RGB digital image, and the second component channel comprises the blue channel of the RGB digital image.

6. The method of claim 1 wherein said dye is a yellow dye.

7. The method of claim 6 wherein said yellow dye comprises a tartrazine dye.

8. The method of claim 1 wherein said radiation-sensitive active component comprises a substantially crystalline image receptive polyacetylenic compound having the structure:

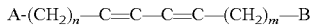

wherein m and n are both independently an integer from 6 to 14 and A and B are independent from one another and are selected from the group consisting of methyl, carboxyl, hydroxy, amido, lower alkyl substituted amido, aliphatic or aromatic carboxylate ester group having up to 10 carbon atoms, mono- or di-valent carboxylate metal salt group, halo, carbamyl, lower alkyl substituted carbamyl or tosyl, triyn or tetrayne products of the above polyacetylenes having from 20 to 60 carbon atoms and a conjugated structure, and combinations thereof.

9. The method of claim 1 wherein said radiation-sensitive active component comprises pentacosadiynoic acid or salts thereof.

10. The method of claim 1 wherein said plurality of known radiation dose levels comprises from about 3 to about 25 different dose levels.

11. The method of claim 1 wherein said known radiation dose levels fall within the range of from about 1 cGy to about 10000 cGy.

12. A radiation dosimetry method comprising:

scanning a radiation dosimetry measurement film which has been exposed to a dose of radiation to generate a digital image, $I_M$;

wherein said radiation dosimetry measurement film comprises a substrate and a layer of radiation-sensitive material disposed on said substrate and wherein said radiation-sensitive material comprises a radiation-sensitive active component and a radiation-impervious dye;

wherein exposure of the radiation-sensitive active component produces a colored compound that exhibits a peak absorbance in a first component channel of a scanner and the radiation-impervious dye exhibits a peak absorbance in a second component channel of the scanner;

adjusting the digital image in the first component channel by accounting for variations present in the image in the second component channel to produce a corrected image.

13. The method of claim 12 further comprising converting the corrected image to an image representing dose by applying a calibration function based on the relationship between absorbed dose and response values in the first component channel.

14. The method of claim 12 wherein the first color channel is the red color channel of the scanner and the second color channel is the blue color channel of the scanner.

15. The method of claim 12 wherein said radiation-sensitive active component comprises a substantially crystalline image receptive polyacetylenic compound having the structure:

A-(CH$_2$)$_n$—C≡C—C≡C—(CH$_2$)$_m$—B wherein m and n are both independently an integer from 6 to 14 and A and B are independent from one another and are selected from the group consisting of methyl, carboxyl, hydroxy, amido, lower alkyl substituted amido, aliphatic or aromatic carboxylate ester group having up to 10 carbon atoms, mono- or di-valent carboxylate metal salt group, halo, carbamyl, lower alkyl substituted carbamyl or tosyl, triyn or tetrayne products of the above polyacetylenes having from 20 to 60 carbon atoms and a conjugated structure, and combinations thereof.

16. The method of claim 15 wherein said radiation-sensitive active component comprises pentacosadiynoic acid or salts thereof.

17. The method of claim 12 wherein said plurality of known radiation dose levels comprises from about 3 to about 25 different dose levels.

18. The method of claim 12 wherein the radiation-impervious dye is selected from the group consisting of tartrazine, eosin, quinoline yellow, metanil yellow and combinations thereof.

* * * * *